United States Patent
Dalton et al.

(10) Patent No.: US 7,760,246 B2
(45) Date of Patent: Jul. 20, 2010

(54) METHOD AND DEVICE FOR ADJUSTING WHITE BALANCE

(75) Inventors: Dan L. Dalton, Greeley, CO (US);
Andrew C. Goris, Loveland, CO (US);
Mark J. Bianchi, Fort Collins, CO (US);
Kevin W. Nay, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1116 days.

(21) Appl. No.: 10/894,780

(22) Filed: Jul. 19, 2004

(65) Prior Publication Data

US 2006/0012689 A1  Jan. 19, 2006

(51) Int. Cl.
*H04N 9/73* (2006.01)

(52) U.S. Cl. .................. 348/224.1; 348/223.1; 382/167

(58) Field of Classification Search ............. 348/223.1, 348/224.1, 225.1
See application file for complete search history.

(56) References Cited

U.S. PATENT DOCUMENTS

| | | | | |
|---|---|---|---|---|
| 5,568,194 A | * | 10/1996 | Abe ..................... | 348/223.1 |
| 5,721,422 A | * | 2/1998 | Bird ..................... | 250/208.1 |
| 5,808,681 A | * | 9/1998 | Kitajima ................ | 348/371 |
| 7,002,624 B1 | * | 2/2006 | Uchino et al. .......... | 348/225.1 |
| 2002/0136551 A1 | * | 9/2002 | Ishihara et al. .......... | 396/161 |

* cited by examiner

*Primary Examiner*—Sinh Tran
*Assistant Examiner*—Paul Berardesca

(57) ABSTRACT

A method and device for adjusting white balance are disclosed herein. The method may comprise generating data representative of an image with and without the use of a strobe. The contribution of the strobe and the contribution of ambient light are on the data are calculated. Based, in part, on the contributions of the ambient light and the strobe, a weight is calculated. The weight is applied to the data in order to adjust the white balance.

23 Claims, 4 Drawing Sheets

METHOD AND DEVICE FOR ADJUSTING WHITE BALANCE

BACKGROUND

Photographing an object or scene under low ambient light conditions may require additional light, such as light provided by a flash or a strobe. The additional light provided by the strobe may cause the photographed image to have color distortions. One cause of the distortions is due to the strobe emitting colors of light that react differently with the scene than the ambient light in the scene. For example, a scene may be illuminated with an incandescent light, which is not bright enough for photography. The strobe, on the other hand, is typically not incandescent light. Accordingly, the view of the scene, when photographed using the additional light of the strobe, may differ substantially from the scene as illuminated solely with incandescent light.

The above-described problems with photographs generated using dual light sources are sometimes attributed to an improper white balance between the light sources. One of the results of improper white balance is a replicated image wherein some surfaces, such as white walls, appear yellow or have a yellow tint. In other situations, some colors will appear different in the photograph than they did in the original scene.

SUMMARY

Methods and devices for adjusting white balance are disclosed herein. One embodiment of the method may comprise generating data representative of an image with and without the use of a strobe. The contribution of the strobe and the contribution of ambient light on the image are calculated. Based, in part, on the contributions of the ambient light and the strobe, a weight or coefficient is calculated. The weight is applied to the data in order to adjust the white balance.

DETAILED DESCRIPTION

Figure 1:
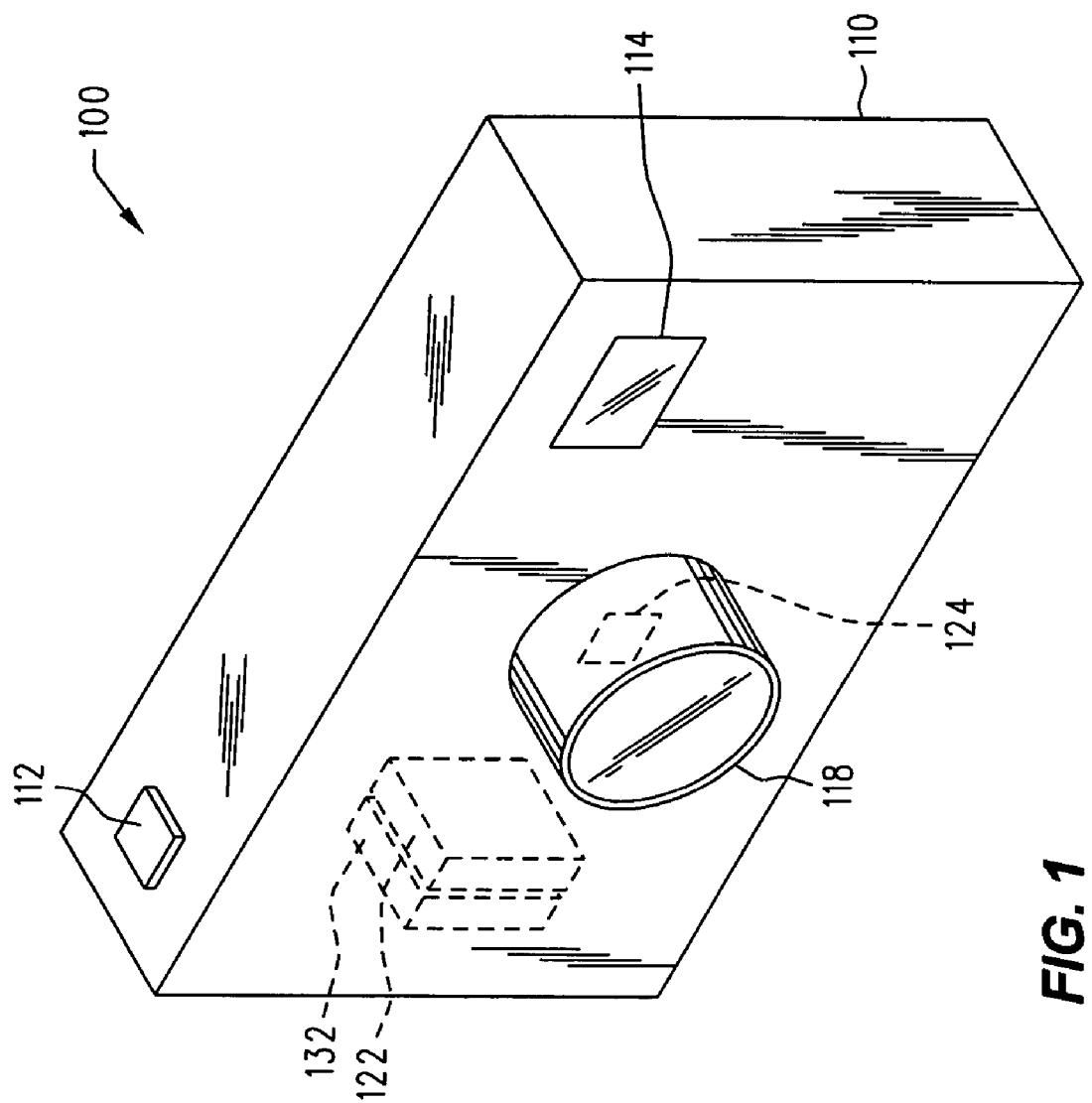
FIG. 1 is a perspective view of an embodiment of a digital camera.

A non-limiting embodiment of a digital camera 100 (sometimes referred to simply as a camera 100) is shown in FIG. 1. The camera 100 generates image data representative of an image of an object. The image data may be output from the camera 100 to a plurality of different viewing devices (not shown), such as printers and video displays, by any of a plurality of known data transmitting devices and protocols. The process of photographing or converting an image of an object to image data is sometimes referred to as imaging or capturing the object. As described in greater detail below, methods of generating image data using the digital camera 100 are disclosed herein. The methods described herein may be used on imaging devices other than digital cameras. For example, the methods described herein may be applied to digital movie cameras.

The camera 100 has a housing 110 with several switches, sensors, and other devices located thereon. For simplicity, only a few of these devices will be described herein. The housing 110 of the camera 100 has a capture button 112, a strobe 114, and a lens 118 located thereon. In addition, a processor 122, a photosensor array 124, and a memory device 132 are located within the housing 110. In the embodiment of the camera 100 described herein, the photosensor array 124 is a two-dimensional photosensor array. The two-dimensional photosensor array 124 may be a charge-coupled device (CCD) and is sometimes referred to simply as the CCD 124. The memory device 132 is shown as being separate from the processor 122. However, the memory device 132 and the processor 122 may be the same device or located on a single circuit. The devices located in and on the housing 110 are electrically or operatively connected to the processor 122.

The lens 118 serves to focus an image of an object or a scene onto the CCD 124. As described below, the CCD 124 serves to convert the image to raw data. Raw data may be a plurality of voltages or numbers. The lens 118 may perform zoom functions so as to focus wide or narrow angle views of the scene onto the CCD 124. The lens 118 may also include a shutter (not shown) that functions similar to a shutter in a film-type camera. The shutter serves to allow light from the scene into the housing 110, where it is focused onto the CCD 124. As with other devices associated with the camera 100, the shutter is controlled by the processor 122. Accordingly, the processor 122 may determine when the shutter opens and the duration that it remains open.

Figure 2:
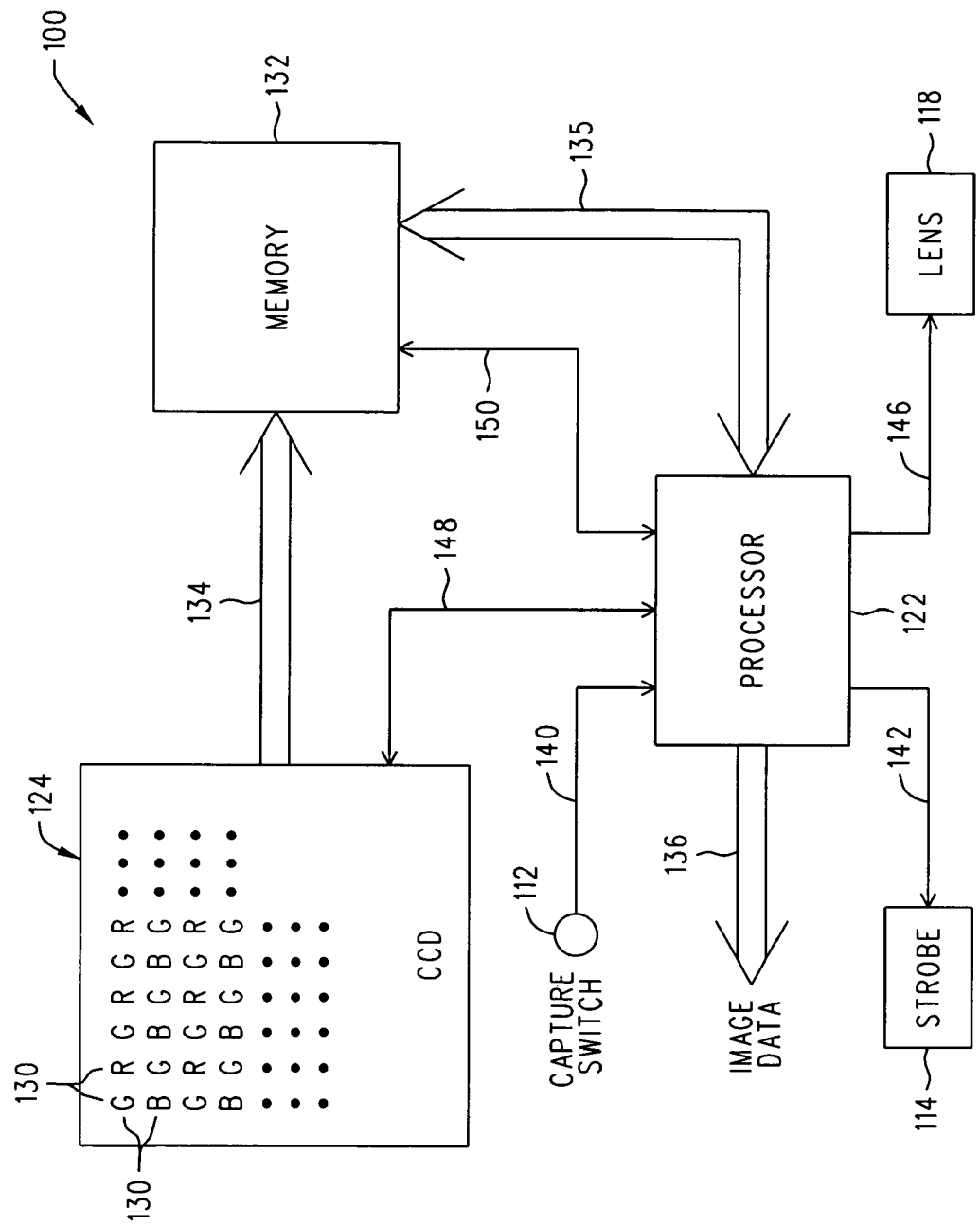
FIG. 2 is a schematic diagram of an embodiment of some of the circuits and devices within the digital camera of FIG. 1.

An embodiment of the CCD 124 is shown in FIG. 2, which is a schematic diagram illustrating some of the devices that may be located in or associated with the camera 100, FIG. 1. As described below, the CCD 124 converts the image of the object focused thereon to raw data. The process of converting an image to data is sometimes referred to as imaging the object. The raw data in the embodiment of the CCD 124 described herein may be a plurality of voltages or binary numbers representative of the image of the object focused onto the CCD 124. A CCD typically generates a plurality of voltages representative of an image. However, these voltages may be converted to binary numbers via an analog to digital converter, not shown.

The CCD 124 has a plurality of photodetectors 130 located thereon. The photodetectors 130 are represented as either a letter R, a letter G, or a letter B. Each photodetector 130 converts a portion of an image to raw data. The collective array of photodetectors 130 convert the entire image focused onto the CCD 124 to raw data. The photodetectors 130 of FIG. 2 are arranged in a Bayer pattern wherein photodetectors corresponding to an R image red light, photodetectors corresponding to a B image blue light, and photodetectors corresponding to a G image green light. It is to be noted that other photodetector patterns or color schemes may be used in the CCD 124.

Each photodetector generates data representative of the intensity of the light it receives. For example, photodetectors that image blue light may output high values when imaging a blue portion of an image. Other photodetectors that image other colors and that are in the vicinity of the blue portion of the image may output low values. The data representative of the intensities of the colors of light is used by a viewing device, such as a monitor or a printer, to replicate the image.

The CCD 124 described herein has a plurality of shift registers associated therewith that may function similar to a temporary memory device. Data generated by the photodetectors 130 may be transferred into the shift registers prior to being output from the CCD 124. Other embodiments of the CCD 124 may be operatively associated with memory devices or may include other types of temporary memory devices.

The memory device 132 is operatively or otherwise electrically connected to the CCD 124. In some embodiments, the memory device 132 may be located within the CCD 124. The memory device 132 stores binary numbers representative of the raw data generated by the photodetectors 130. Accordingly, the raw data generated by the CCD 124 may be converted to a digital format prior to being stored in the memory device 132. In one embodiment, the memory device 132 is a dynamic random access memory or DRAM. In the embodiment shown in FIG. 2, a data line 134 is connected between the CCD 124 and the memory device 132. The data line 134 serves to transfer data between the CCD 124 and the memory device 132.

The memory device 132 may be able to store data representative of different portions of an image. These different portions of an image are referred to herein as fields. In the embodiment of the CCD 124 described herein, a field represents one third of the data representative of an image. Accordingly, an image requires three fields in order to be fully replicated. Other embodiments of the CCD 124 may proportion images into different numbers of fields.

With additional reference to FIG. 1, the processor 122 is connected or otherwise operatively connected to most of the above-described devices in the camera 100. The processor 122 controls many of the above-described devices, processes data, and outputs data from the camera 100. A data line 135 connects between the memory device 132 and the processor 122. Another data line 136 connects the processor to a port or the like (not shown) on the housing 110 of the camera 100 and serves to output data, such as image data, from the camera 100. A data line 142 connects between the strobe 114 and the processor 122. A data line 146 connects between the lens 118 and the processor 122. The data line 146 may also connect between the processor 122 and the shutter located within or associated with the lens 118. A data line 148 connects between the CCD 124 and the processor 122. A data line 150 connects between the memory device 132 and the processor 122.

Having described some of the components of the camera 100, the operation of the camera 100 will now be described followed by a description of adjusting and/or correcting the white balance.

When the camera 100 is in use, a user selects an object or scene to be photographed or captured. This process is also referred to as imaging an object or a scene. The user may view the scene through a view finder (not shown) or a display device (not shown) located on the camera 100. The image of the scene is focused onto the CCD 124 and, more particularly, onto the photodetectors 130 by the lens 118. In some embodiments, the user may zoom the view of the scene in or out by use of the lens 118. The CCD 124 measures ambient light of the scene and transmits data representative of the ambient light to the processor 122 via the data line 148. The data may also be transmitted to the processor 122 via the data lines 134 and 135 and the memory 132. The processor 122 may then determine whether the strobe 114 is required to be activated during the imaging process. In some embodiments, the processor 122 may also determine the intensity of the light emitted by the strobe 114 and the duration that the strobe 114 emits light. When the strobe 114 emits light, it is sometimes referred to as being active.

When the user toggles the capture switch 112, the processor commences performing the imaging process, which converts an image of the scene to image data. In summary, the processor 122 receives data from the CCD 124 regarding the intensity of the ambient light. Based on the intensity of the ambient light, the processor 122 determines whether the strobe 114 should be activated. The processor 122 may also determine the duration in which the photosensors 130 are required to convert intensities of light to raw data. This may be achieved by opening the shutter for a preselected period.

The processor 122 may then transmit instructions to the CCD 124 via the data line 148, which cause the CCD 124 to generate raw data. The processor 122 may also cause the strobe 114 to activate depending on the intensity of the ambient light of the scene being captured. After a period of time, the processor 122 transmits instructions to the CCD 124, which cause the CCD 124 to output raw data to the memory device 132. In one embodiment of the CCD 124, the raw data is in the form of voltages that are output from the CCD 124 as a bucket brigade. In other embodiments, the raw data may be in the form of binary numbers. The period of time in which the CCD 124 images the scene may be calculated by the processor 122 or it may be selected or calculated externally. For example, a user or an external computer, not shown, may select the amount of time that the CCD 124 images the scene. Imaging may also cease by the processor 122 causing the shutter to close.

The memory device 132 may store raw data representative of several or all the fields of an image. In summary, a field is a portion of data that represents a portion of an entire image. For example, a field of an image may be raw data generated by a plurality of rows of photodetectors 130. In the embodiment described herein the CCD 124 is portioned into three fields. A first field is representative of raw data generated by a first row of photodetectors 130 and every third row thereafter. A second field is representative of raw data generated by the second row of photodetectors 130 and every third row thereafter. A third field is representative of raw data generated by the third row of photodetectors 130 and every third row thereafter.

The processor 122 may transmit instructions to the memory device 132 via the line 150, which causes the raw data to be transmitted to the processor 122 via the data line 135. In some embodiments, a single field may be transmitted to the processor 122. It should be noted that the raw data may be transmitted to other devices internal or external to the camera 100. The processor 122 may also cause specific fields to be transferred to the shift registers (not shown) in the CCD 124. As described above, the raw data may be converted to digital data prior to being transmitted or during the transmission to the memory device 132 or other devices within the camera 100 or associated with the camera 100.

The processor 122 may convert the raw data to image data, which may be used by other devices to replicate the captured image. For example, the processor may convert the raw data to the joint photograph expert group (JPEG) format in order to display the captured image on a viewing device or print the image on a printer. The processor 122 may also process data generated by the photodetectors 130. For example, the processor 122 may perform mathematical functions on the data generated by the photodetectors 130, such as addition, subtraction, multiplication, and division.

Having summarily described the operation of the camera 100, the process for correcting and/or adjusting the white balance will now be described.

The white balance adjustment described herein adjusts for ambiguities in lighting that may distort captured images. The lighting may be, as examples, ambient lighting or light emitted by the strobe 114. With reference to lighting provided by the strobe, the strobe 114 illuminates a scene or object which is being imaged or captured in low light conditions. If a single white balance correction is used to correct a scene illuminated in varying proportions by ambient light and the strobe 114, the color of some objects may appear unnatural.

This unnatural color is due to the light emitted by the strobe 114 may having some spectral components that are different than the ambient light. Accordingly, objects illuminated by the strobe 114 may require a different white balance than objects illuminated solely by ambient light. For example, an image of a white wall illuminated with yellowish tungsten lighting will appear white after applying tungsten white balance correction to the image. Furhtermore, the same wall will also appear white if there is no ambient light because the strobe 144 supplies all the illumination and the strobe white balance can be applied to the image. However, if the strobe white balance correction is applied to an image containing both tungsten illumination and strobe illumination, the wall may appear yellow if it is illuminated primarily by the tungsten illumination.

Figure 3A:
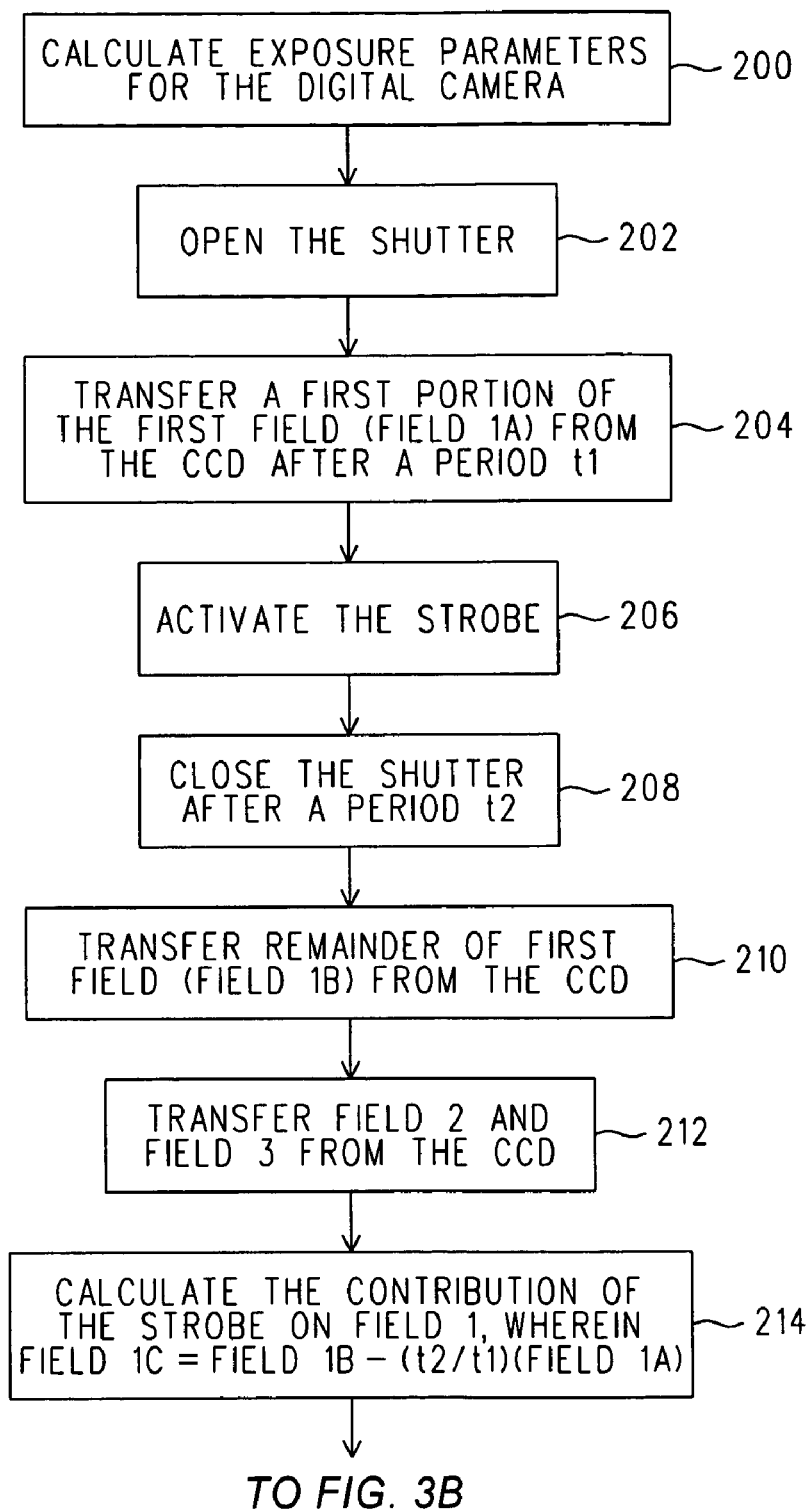
FIGS. 3A and 3B are a flow chart illustrating an embodiment of adjusting the white balance in the digital camera of FIGS. 1 and 2.
Figure 3B:
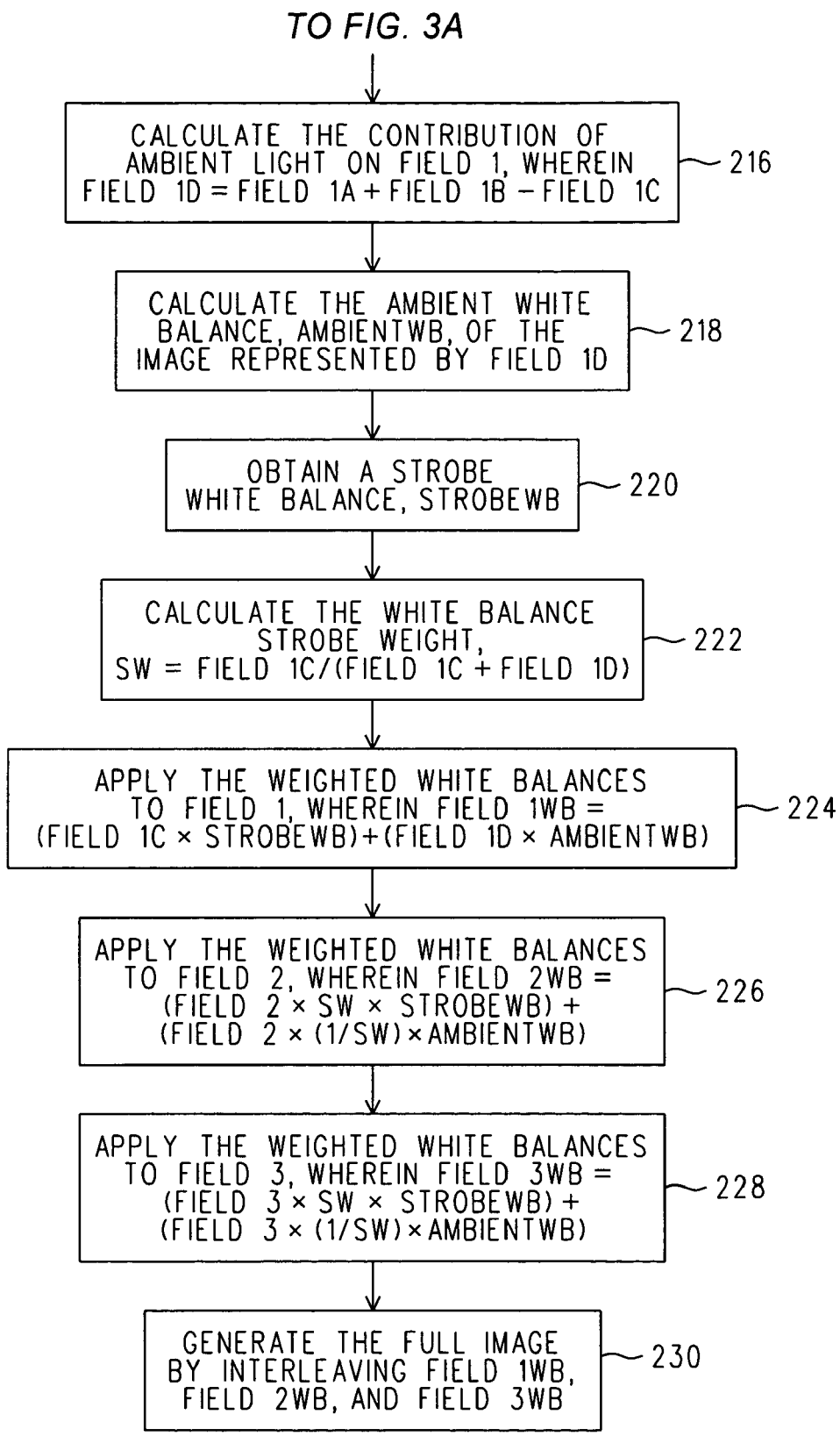

An example of the process of adjusting or correcting the white balance is shown in the flow chart of FIGS. 3A and 3B. With reference to FIGS. 2, 3A, and 3B, an embodiment of correcting or adjusting the white balance using the digital camera 100 will be described. At step 200 of FIG. 3A, the camera 100 calculates exposure parameters for an image that is to be captured. For example, the processor 122 may receive data from various devices, such as ambient light intensity from the CCD 124 or from the user, and may calculate the above-described exposure parameters. These exposure parameters may include the intensity and duration of light emitted by the strobe 114 and the duration that the photodetectors 130 are exposed to light. The shutter associated with the lens 118 is opened in step 202 after the exposure parameters have been calculated. When the shutter is opened, the photodetectors 130 start charging at a rate representative of the intensity of light they receive.

At step 204 data representative of a first portion of a first field is transferred from the CCD 124. The first field is referred to as field 1 and the first portion of the first field is referred herein as field 1A. Data representative of field 1A is sometimes referred to as first data. The transfer of field 1A occurs at a period t1 from the time the shutter was opened. In the embodiment described herein, field 1A is transferred from the CCD 124. More specifically, field 1A is transferred to the shift registers in the CCD 124. The transfer clears the field 1 photodetectors, which enables them to begin a new exposure. In other embodiments, field 1A may be transferred to the memory device 132. As set forth above, field 1 and, thus field 1A, is data generated by the row of photodetectors 130 on the first row of the CCD 124 and every third row thereafter.

At step 206 the strobe 114 is activated. The intensity of light emitted by the strobe and time that the strobe 114 remains active may be calculated by the processor 122 or set by a user of the camera 100. After a period t2, the shutter is closed as shown by step 208. Closing the shutter stops the photodetectors 130 from charging or exposing any further.

After the shutter is closed, data representative of field 1 again is transferred from the CCD 124 as described in step 210. The second transfer of data of field 1 is referred to as field 1B and is representative of the image illuminated by the strobe 114. Field 1B is sometimes referred to as second data. At step 212, data representative of field 2 and field 3 are transferred from the CCD 224. In the embodiment of the CCD 124 described herein, field 2 is data generated by the second row of photodetectors 130 and every third row thereafter. Likewise, field 3 is data generated by the third row of photodetectors and every third row thereafter. At this point, all fields have been transferred from the CCD 124. Field 1 is in two portions, wherein field 1A is representative of the image prior to activation of the strobe 114, and field 1B is representative of the image during or after activation of the strobe 114.

At step 214, the contribution of the strobe on field 1 is calculated. This field is referred to as field 1C and, in the embodiment described herein, is calculated as follows:

$$\text{Field } 1C = \text{Field } 1B - \frac{t2}{t1}(\text{Field } 1A)$$

In the above-described equation, the values generated by the individual photodetectors 130 are processed. For example each photodetector in field 1 generates values or data in both fields 1A and 1B. Data generated by these individual photodetectors is processed in order to yield field 1C. Data representative of field 1C is sometimes referred to as the third data.

At step 216 the contribution of ambient light on field 1 is calculated and is referred to as field 1D. Data representative of field 1D is sometimes referred to as fourth data. Field 1D in the embodiment described herein is equal to field 1A plus field 1B minus field 1C. As set forth above, the values generated by or corresponding to individual photodetectors are added or subtracted to obtain field 1D.

At step 218 the ambient white balance of the image represented by the field 1D is calculated by analyzing field 1D and employing one of many white balance algorithms that are known in the digital imaging art. The ambient white balance is referred to herein as AMBIENTWB and may be obtained by calculations or other known methods. At step 220, the strobe white balance is obtained. In one embodiment, the strobe white balance is calculated or measured based on the spectral characteristics of the strobe 114 as is known in the art. For example, the strobe white balance may be measured during the manufacture of the camera 100 and stored in the memory device 132. The strobe white balance is referred to herein as STROBEWB.

At step 222, the white balance strobe weight is calculated. The white balance strobe weight relates to the effect of the strobe 114 on the image relative to the image captured without the strobe 114. The white balance strobe weight is referred to herein as SW and may be calculated as follows:

$$SW = \frac{\text{Field}}{(\text{Field } 1C + \text{Field } 1D)}$$

At step 224, the weighted white balances are applied to field 1 to render a field 1WB. As described in greater detail below, field 1WB is used as in lieu of field 1 during processing and the like. More specifically, field 1WB is used rather than the data generated by the CCD 124 as field 1. Field 1WB is calculated as follows:

Field 1*WB*=(Field 1*C*×STROBE*WB*)+(Field 1*D*× AMBIENT*WB*)

At step 226, the weighted white balances are applied to field 2 to render a field 2WB. As with field 1, field 2WB is used as in lieu of field 2 during processing and the like. Field 2WB is calculated as follows:

Field 2*WB*=(Field 2×*SW*×STROBE*WB*)+(Field 2× (1/*SW*)×AMBIENT*WB*)

At step 228, the weighted white balances are applied to field 3 to render a field 3WB. As with fields 1 and 2, field 3WB is used as in lieu of field 3 during processing and the like. Field 3WB is calculated as follows:

Field 3*WB*=(Field 3×*SW*×STROBE*WB*)+(Field 3× (1/*SW*)×AMBIENT*WB*)

At step 330, the full image is created by interleaving field 1WB, field 2WB, and field 3WB. Thus, the raw data generated by the first row of photodetectors and every third row thereafter is replaced with the field 1WB. The raw data generated by the second row of photodetectors and every third row thereafter is replaced with the field 2WB. The raw data generated by the third row of photodetectors and every third row thereafter is replaced with the field 3WB. Thus, the full image contains all three fields with the correct white balance applied to each field. The processor 122 may then process, such as compress, the data and output the data in a suitable format. For example, the processor 122 may compress the data per the JPEG standards and output the JPEG data on the data line 136.

Having described some embodiments of the camera 100 and methods of using the camera 100, other embodiments will now be described.

In the above-described embodiments, field 1A is representative of data generated using ambient light and field 1B is representative of data generated using ambient light and the light emitted by the strobe 114. In other embodiments, field 1A may be representative of data generated by both ambient light and the light emitted by the strobe 114. Likewise, field 1B may be representative of data generated solely by ambient light.

The order in which the fields are transferred from the CCD 124 may vary in other embodiments. It should be noted that field 1A has to be transferred before the other fields because it represents partial exposure of field 1.

In the above-described embodiments, only one field, field 1, was portioned into data generated with and without the strobe 114. Other embodiments may use two or more fields rather than one field to generate data with and without the strobe 114. For example, at time t1, data from field 1 may be transferred to a first shift register and designated as field 1A. At the same time, data from field 2 may be transferred to a second shift register and designated field 2A.

In another embodiment, two images including all the fields may be captured and processed as described above. The first image is captured without the use of the strobe 114 and the second image is captured during and possibly after activation of the strobe 114. This embodiment requires a larger shift register or the like than the embodiments described above.

Referring again to the processor 122 and its related components, the processor may perform the above-described functions by executing computer code or electronically executable instructions. These may be implemented in any suitable manner, such as software, firmware, hard-wired electronic circuits, or as the programming in a gate array, etc. Software may be programmed in any programming language, such as machine language, assembly language, or high-level languages such as C or C++. The computer programs may be interpreted or compiled.

Computer readable or executable code or electronically executable instructions may be tangibly embodied on any computer-readable storage medium or in any electronic circuitry for use by or in connection with the processor 122 and/or the memory device 132 or any other related device.

The memory device 132 may be a storage medium for tangibly embodying computer readable or executable code or electronically executable instructions includes any means that can store, transmit, communicate, or in any way propagate the code or instructions for use by or in connection with the instruction-executing device. For example, the storage medium may include (but is not limited to) any electronic, magnetic, optical, or other storage device, or any transmission medium such as an electrical conductor, an electromagnetic, optical, infrared transmission, etc. The storage medium may even comprise an electronic circuit, with the code or instructions represented by the design of the electronic circuit. Specific examples include magnetic or optical disks, both fixed and removable, semiconductor memory devices such as memory cards and read-only memories (ROMs), including programmable and erasable ROMs, non-volatile memories (NVMs), optical fibers, etc. Storage media for tangibly embodying code or instructions also include printed media such as computer printouts on paper which may be optically scanned to retrieve the code or instructions, which may in turn be parsed, compiled, assembled, stored and executed by an instruction-executing device. The code or instructions may also be tangibly embodied as an electrical signal in a transmission medium such as the Internet or other types of networks, both wired and wireless.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for adjusting white balance when generating an image representative of a scene during a time period with a photosensor array, wherein said image is portioned into a plurality of fields, one of said plurality of fields being a first field; the method comprising:

not illuminating said scene with a strobe during a first portion of the time period;

transferring first data representative of the first field from the photosensor array after said first portion of the time period;

illuminating said scene with said strobe during a second portion of the time period;

transferring second data representative of said first field from the photosensor array after said second portion of the time period;

transferring data representative of the remaining fields;

calculating a contribution of said strobe on said first field, the result being third data;

calculating a contribution of ambient light on said first field based on said first data, the result of said calculating being fourth data;

obtaining an ambient white balance of the scene represented by said fourth data;

obtaining a strobe white balance related to said strobe;

calculating a white balance strobe weight based on said third data and said fourth data;

applying said ambient white balance and said strobe white balance to the first field, the result being a weighted field; and applying ambient white balance, said strobe white balance, and said white balance strobe weight to the remaining fields, the result being weighted fields.

2. The method of claim 1, wherein said transferring first data representative of a first field comprises transferring first data representative of a first field into at least one shift register.

3. The method of claim 1, wherein said calculating the contribution of said strobe on said first field comprises subtracting the ratio of said second portion of the time period to said first portion of the time period multiplied by said first data from said second data.

4. The method of claim 1, wherein said calculating the contribution of ambient light on said first field comprises adding said first data to said second data and subtracting said third data from the result.

5. The method of claim 1, wherein said calculating a white balance strobe weight comprises dividing said third data by the sum of said third data and said fourth data.

6. The method of claim 1, wherein applying said ambient white balance and said strobe white balance to the first field comprises multiplying said third data by said strobe white balance and adding said fourth data multiplied by said ambient white balance.

7. The method of claim 1, wherein said generating an image comprises generating data representative of a scene using a two-dimensional photosensor array comprised of a plurality of photodetectors, wherein said data is portioned into a plurality of fields.

8. The method of claim 1, wherein at least one of said plurality of fields comprises rows of photodetectors on a two-dimensional photosensor array.

9. The method of claim 1 and further comprising interleaving the weighted fields with one another to generate data representative of a complete scene.

10. An imaging device comprising:
a photosensor array, wherein an image representative of a scene is generatable by said photosensor array during a time period, said image being proportioned into a plurality of fields;
at least one computer readable medium; and
computer readable program code stored on said at least one computer readable medium, said computer readable program code comprising instructions for operating said imaging device by:
not illuminating said scene with a strobe during a first portion of the time period;
transferring first data representative of a first field of said plurality of fields from said photosensor array, said first data being generated during said first portion of the time period;
illuminating said scene with said strobe during a second portion of the time period;
transferring second data representative of said first field from said photosensor array, said second data being generated during said second portion of the time period;
transferring data representative of the remaining fields from said photosensor array;
calculating a contribution of said strobe on said first field, the result being third data;
calculating a contribution of ambient light on said first field based on said first data, the result of said calculating being fourth data;
obtaining an ambient white balance of an image represented by said fourth data;
obtaining a strobe white balance related to said strobe;
calculating a white balance strobe weight based on said third data and said fourth data;
applying said ambient white balance and said strobe white balance to the first field, the result being a weighted field; and
applying ambient white balance, said strobe white balance, and said white balance strobe weight to the remaining fields, the result being weighted fields.

11. The device of claim 10, wherein said transferring first data representative of a first field comprises transferring first data representative of a first field into at least one shift register.

12. The device of claim 10, wherein said calculating the contribution of said strobe on said first field comprises subtracting the ratio of said second portion of the time period to said first portion of the time period multiplied by said first data from said second data.

13. The device of claim 10, wherein said calculating the contribution of ambient light on said first field comprises adding said first data to said second data and subtracting said third data from the result.

14. The device of claim 10, wherein said calculating a white balance strobe weight comprises dividing said third data by the sum of said third data and said fourth data.

15. The device of claim 10, wherein applying said ambient white balance and said strobe white balance to the first field comprises multiplying said third data by said strobe white balance and adding said fourth data multiplied by said ambient white balance.

16. The device of claim 10, wherein said computer readable program code further comprises instructions for operating said imaging device by interleaving the weighted fields with one another to generate data representative of a complete scene.

17. A digital camera comprising:
imaging means for converting a scene to data during a time period;
illumination means for illuminating a scene that is to be converted to data, wherein said data comprises a plurality of fields which make up a full image;
processing means for:
not illuminating said scene with an illumination means for a first portion of the time period;
transferring first data representative of a first field of said plurality of fields from said imaging means said first data being generated during said first portion of the time period;
illuminating said scene with said illumination means for a second portion of the time period;
transferring second data representative of said first field from said imaging means, said second data being generated during said second portion of the time period;
transferring data representative of the remaining fields from said imaging means;
calculating a contribution of said illumination means on said first field, the result being third data;
calculating a contribution of ambient light on said first field based on said first data, the result of said calculating being fourth data;
obtaining an ambient white balance of the image represented by said fourth data;
obtaining a strobe white balance related to said illumination means;
calculating a white balance strobe weight based on said third data and said fourth data;
applying said ambient white balance and said strobe white balance to the first field, the result being a weighted field; and
applying ambient white balance, said strobe white balance, and said white balance strobe weight to the remaining fields, the result being weighted fields.

18. The camera of claim 17, wherein said transferring first data representative of a first field comprises transferring first data representative of a first field into at least one shift register.

19. The camera of claim 17, wherein said calculating the contribution of said illumination means on said first field comprises subtracting the ratio of said second portion of the time period to said first portion of the time period multiplied by said first data from said second data.

20. The camera of claim 17, wherein said calculating the contribution of ambient light on said first field comprises adding said first data to said second data and subtracting said third data from the result.

21. The camera of claim 17, wherein said calculating a white balance strobe weight comprises dividing said third data by the sum of said third data and said fourth data.

22. The camera of claim 17, wherein applying said ambient white balance and said strobe white balance to the first field comprises multiplying said third data by said strobe white balance and adding said fourth data multiplied by said ambient white balance.

23. The camera of claim 17, wherein said processing means further comprises interleaving the weighted fields with one another to generate data representative of a complete scene.

* * * * *